Patented Aug. 17, 1948

2,447,400

UNITED STATES PATENT OFFICE 2,447,400

OXIDATION OF AROMATIC HYDROCARBONS

William S. Emerson and Josef W. Heyd, Dayton, Ohio, assignors to Monsanto Chemical Company, St. Louis, Mo., a corporation of Delaware No Drawing. Application January 18, 1946, Serial No. 642,136

4 Claims. (Cl. 260—592)

This invention relates to a process for oxidizing isopropylbenzene and more specifically provides an improved process for obtaining acetophenone and dimethylphenyl carbinol by the catalytic oxidation of isopropylbenzene in the liquid phase by means of an oxygen-containing gas in the presence of calcium hydroxide as the sole oxidation catalyst.

It has heretofore been proposed, as for example, in Patent Numbers 2,245,528 and 1,813,606 to conduct the catalytic oxidation of such hydrocarbons as isopropylbenzene in the presence of salts or oxides of heavy metals in order to obtain carbinols and ketones. We have found, however, that the percentage conversion obtained according to the processes described in the prior art, as well as the cost of the catalyst previously employed, render the process commercially unfavorable when applied specifically to isopropylbenzene. Moreover, some of the previous catalysts employed give a greater conversion to acid than to carbinol, thus decreasing the yields of the desired products, i. e., the carbinol and the ketone.

Although a great many catalysts, some of them being of an extremely complex composition, have been tried for the oxidation of isopropylbenzene, we have found that the reaction is best carried out by conducting the reaction in the presence of a catalyst consisting of hydrated lime, i. e., either a pure or a technical grade of calcium hydroxide.

The invention is further illustrated, but not limited, by the following examples:

EXAMPLE 1

This example illustrates the liquid phase oxidation of isopropylbenzene at atmospheric pressures in the presence of calcium hydroxide.

The apparatus used for the oxidation consisted of a 1-liter 3-necked flask having standard tapered joints and being fitted with a thermometer, porous Alundum disperser thimble, a gas inlet and a spiral reflux condenser. The condenser was connected to a second spiral condenser at the bottom of which was fitted a 500 cc. 24/40 flask having a connection to a water pump. The isopropylbenzene and the catalyst employed were charged to the flask, air was passed through the isopropylbenzene-catalyst mixture and the temperature of the reaction mixture was raised to about 120° C. by means of an oil bath. Air was passed through the reaction mixture for approximately 28 hours, during which time the temperature varied from 130° C. to 140° C.

400 g. of isopropylbenzene was used and the amount of calcium hydroxide employed amounted to about 1% by weight of the hydrocarbon. The amount of calcium hydrate may, however, be varied over wide limits without changing the results obtained.

The constituents of the reaction mixture were separated in the following manner: Upon completion of the oxidation, i. e., after passage of air through the isopropylbenzene-catalyst mixture, the reaction mixture was allowed to cool to room temperature, diluted with benzene and filtered in order to remove the catalyst. The filtrate was then treated with sufficient of a 1% sodium hydroxide solution to neutralize the benzoic acid and the sodium benzoate solution, after concentration, was acidified, filtered and the benzoic acid dried to constant weight. The material remaining after separating out the sodium benzoate was subsequently dried over potassium carbonate, filtered and submitted to fractional distillation. Upon separation of the benzene the fraction boiling at 43°/1.5 mm. to 46°/1.0 mm., representing a mixture of acetophenone and dimethylphenyl carbinol was collected.

For purposes of comparison similar runs were made employing the catalysts indicated in the table below:

Table I

| Catalyst | Percent Converted to Ketone and Carbinol | Percent Converted to Acid | Percent Isopropylbenzene Recovered | Yield of Ketone and Carbinol | | Percent Carbinol in Product |
|---|---|---|---|---|---|---|
| | | | | Minimum Yield, Percent | Maximum Yield, Percent | |
| $Ca(OH)_2$ | 35.8 | 0.9 | 50.0 | 71.6 | 89.2 | 59 |
| $V_2O_5+Cr_2O_3$ | 33.7 | 2.0 | 45.0 | 61.3 | 82.4 | 22 |
| $CeO_2.XH_2O+CoCO_3$ | 9.7 | 0.2 | 80.9 | 50.5 | 86.2 | 77 |
| $V_2O_5+CeO_2.XH_2O$ | 21.0 | 0.6 | 69.2 | 68.0 | 83.3 | 36 |
| $CaCO_3+Pb$ benzoate | 30.5 | 0.2 | 41.1 | 52.0 | 76.0 | 29 |
| $Cr_2O_3+Ca(OH)_2$ | 20.7 | 0.12 | 71.4 | 72.1 | 87.4 | 55 |
| $CuO.XH_2O$ | 26.2 | 0.05 | 60.6 | 66.7 | 78.0 | 47 |
| Mn acetate | 26.0 | 5.9 | 63.6 | 71.5 | 71.9 | 50 |
| Hg benzoate | 21.0 | 1.25 | 69.3 | 68.5 | 68.5 | 5 |

In the table above the minimum yields indicate the per cent theoretical yield of acetophenone or a mixture of acetophenone and dimethylphenyl carbinol, based on the unrecovered ethylbenzene. Material balances showed, however, that some mechanical loss occurred during the oxidation, for example, by volatilization of both the isopropylbenzene and the product. The maximum yields, shown above, take such losses into consideration and represent the yield expected in an apparatus provided with efficient recovery means. The unconverted isopropylbenzene may, of course, be returned to the reactor for further treatment. The above runs show that calcium hydroxide is a more efficient catalyst for the oxidation than the other catalyst employed in the experiments, the use of calcium hydroxide alone resulting in both high conversion and very good yields.

EXAMPLE 2

This example illustrates the liquid phase oxidation of isopropylbenzene under superatmospheric pressure in the presence of calcium hydroxide as catalyst.

Oxidation was carried out in an autoclave at a pressure of 250 pounds and a temperature of 130° C. for 6 hours. 400 g. of isopropylbenzene and 4 g. of calcium hydroxide were charged into the autoclave and air was led into it continuously with stirring while maintaining the pressure indicated above. At the end of the run the autoclave was allowed to cool to room temperature and the reaction product was worked up as in Example 1. The following results were obtained:

|  | Per cent |
|---|---|
| Conversion | 37.7 |
| Carbinol in product | 35.0 |
| Isopropylbenzene recovered | 48.0 |
| Minimum yield | 65.6 |
| Maximum yield | 83.1 |

Employing the same conditions, but using compounds of heavy metals as catalysts, the following conversions were obtained when working under pressure:

| Catalyst | Per Cent Conversion |
|---|---|
| $V_2O_5$ | 29.5 |
| $Cr_2O_3+CeO_2$ | 24.2 |
| $Cr_2O_3.CuO$ | 28.5 |
| $Co(OH)_2$ | 15.3 |

The experiments of this example indicate that calcium hydroxide alone is an efficient catalyst for the oxidation of isopropylbenzene under superatmospheric pressure, as well as under the atmospheric pressure employed in Example 1.

The temperature employed for the oxidation should preferably be maintained at a point above the decomposition temperature of peroxides, which may form in the mixture at temperatures below 80° C. or 85° C. Suitable temperatures for the reaction when it is carried out at atmospheric pressure may be within the range of from 100° C. to the boiling point of the hydrocarbon at atmospheric pressure, which, in the case of isopropylbenzene is 145° C. It is, of course, not necessary that the process be restricted to operation at atmospheric pressure, since satisfactory operation may also be obtained at pressures below normal atmospheric pressure as well as at pressures above atmospheric.

Reaction may be effected in presence or absence of a diluent of either the hydrocarbon employed or the oxidizing medium. Also, while we prefer to use air as the oxidizing medium, we may use pure oxygen or a prepared mixture of oxygen with an inert gas.

What we claim is:

1. The process which includes contacting isopropylbenzene at a temperature below its boiling point with gaseous oxygen in the presence of an oxidation catalyst consisting of calcium hydroxide, and recovering from the oxidation product acetophenone.

2. The process which includes contacting isopropylbenzene at a temperature above 80° C. but below its boiling point with molecular oxygen in the presence of an oxidation catalyst consisting of calcium hydroxide, and recovering from the oxidation product acetophenone.

3. The process which includes contacting isopropylbenzene at a temperature above 80° C. but below its boiling point with molecular oxygen in the presence of an oxidation catalyst consisting of calcium hydroxide, and recovering from the oxidation product acetophenone and dimethylphenyl carbinol.

4. The process which includes contacting isopropylbenzene at a temperature of about 120° C. with atmospheric air in the presence of an oxidation catalyst consisting solely of calcium hydroxide, and recovering from the oxidation product acetophenone and dimethylphenyl carbinol.

WILLIAM S. EMERSON.
JOSEF W. HEYD.

REFERENCES CITED

The following references are of record in the file of this patent:

UNITED STATES PATENTS

| Number | Name | Date |
|---|---|---|
| 1,813,606 | Binapfl | July 7, 1931 |